US006388048B1

(12) United States Patent
Laycock et al.

(10) Patent No.: US 6,388,048 B1
(45) Date of Patent: May 14, 2002

(54) COMPLEXING AGENT-MODIFIED TRIMETAL CYANIDE CATALYST

(75) Inventors: David E. Laycock, Ontario; Kendra L. Flagler, Fenelon Falls, both of (CA); Robert J. Gulotty, Jr., Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/574,924

(22) Filed: May 19, 2000

(51) Int. Cl.$^7$ .................. C07C 43/11; C08G 59/68; C08G 65/12; B01J 31/12
(52) U.S. Cl. ............... 528/412; 502/153; 502/156; 528/414; 528/415; 568/606
(58) Field of Search ................ 528/414, 415, 528/412; 502/153, 156; 568/606

(56) References Cited

U.S. PATENT DOCUMENTS

| | | | |
|---|---|---|---|
| 3,278,457 A | * 10/1966 | Milgrom | |
| 3,278,458 A | * 10/1966 | Belner | |
| 3,278,459 A | * 10/1966 | Herold | |
| 3,404,109 A | * 10/1968 | Milgrom | |
| 3,427,256 A | * 2/1969 | Milgrom | |
| 3,427,334 A | * 2/1969 | Belner | |
| 3,427,335 A | * 2/1969 | Herold | |
| 3,829,505 A | * 8/1974 | Herold | 568/606 |
| 4,477,589 A | * 10/1984 | Van der Hulst et al. | 528/415 X |
| 5,266,681 A | * 11/1993 | Reisch et al. | 528/414 |
| 5,470,813 A | * 11/1995 | Le-Khac | 502/156 |
| 5,482,908 A | * 1/1996 | Le-Khac | 502/156 |
| 5,589,431 A | * 12/1996 | Le-Khac | 502/175 |
| 5,627,120 A | * 5/1997 | Le-Khac | 502/156 |
| 6,204,357 B1 | * 3/2001 | Ooms et al. | 502/153 X |

FOREIGN PATENT DOCUMENTS

| | | | |
|---|---|---|---|
| CN | 1044663 A | * 8/1990 | |
| EP | 0 892 002 A1 | 1/1999 | |
| WO | WO99/16775 | * 4/1999 | C07F/15/06 |

OTHER PUBLICATIONS

Herold et al., Hexacyanometalate Salt Complexes As Catalysts For Epoxide Polymerizations, ACS Polymerization Kinetics and Technology, vol. 128, p. 208 (1973).*
Livigni et al., Poly(Propylene Ether) Polyols Prepared With A Zinc Hexacyanocobaltate Complex Catalyst, polyethers, pp. 20–37 ACS Symp. Ser. (1975), 6 (Polyethers, Symp. 1974).*

* cited by examiner

Primary Examiner—Richard D. Lovering

(57) ABSTRACT

Metal [hexacyanocobaltate, cobalthexanitrite nitroferricyanide] complexes are useful alkylene oxide polymerization catalysts. The metal is any that forms a precipitate with the hexacyanocobaltate, cobalthexanitrite and nitroferricyanide groups. These catalysts are made from less expensive raw materials than the common zinc hexacyanocobaltate catalysts, and provide short induction periods and many cases more controlled exotherms. In addition, the metal [hexacyanocobaltate, cobalthexanitrite nitroferricyanide] catalysts often provide poly(propylene oxide) polymers having very low unsaturations, even when the catalyst is complexed with a complexing agent such as glyme.

17 Claims, No Drawings

COMPLEXING AGENT-MODIFIED TRIMETAL CYANIDE CATALYST

BACKGROUND OF THE INVENTION

This invention relates to metal catalysts for alkylene oxide polymerization.

Alkylene oxides such as ethylene oxide, propylene oxide and 1,2-butylene oxide are polymerized to form a wide variety of polyether products. For example, polyether polyols are prepared in large quantities for polyurethane applications. Other polyethers are used as lubricants, brake fluids, compressor fluids, and many other applications.

These polyethers are commonly prepared by polymerizing one or more alkylene oxides in the presence of an initiator compound and an alkali metal catalyst. The initiator compound is typically a material having one or more hydroxyl, primary or secondary amine, carboxyl or thiol groups. The function of the initiator is to set the nominal functionality (number of hydroxyl groups/molecule) of the product polyether, and in some instances to incorporate some desired functional group into the product.

Until recently, the catalyst of choice was an alkali metal hydroxide such as potassium hydroxide. Potassium hydroxide has the advantages of being inexpensive, adaptable to the polymerization of various alkylene oxides, and easily recoverable from the product polyether.

However, to a varying degree, alkali metal hydroxides catalyze an isomerization of propylene oxide to form allyl alcohol. Allyl alcohol acts as a monofunctional initiator during the polymerization of propylene oxide. Thus, when potassium hydroxide is used to catalyze a propylene oxide polymerization, the product contains allyl alcohol-initiated, monofunctional impurities. As the molecular weight of the product polyether increases, the isomerization reaction becomes more prevalent. Consequently, 800 or higher equivalent weight poly(propylene oxide) products prepared using KOH as the catalyst tend to have very significant quantities of the monofunctional impurities. This tends to reduce the average functionality and broaden the molecular weight distribution of the product.

More recently, the so-called double metal cyanide (DMC) catalysts have been used commercially as polymerization catalysts for alkylene oxides. Because some of these catalysts do not significantly promote the isomerization of propylene oxide, polyethers having low unsaturation values and higher molecular weights can be prepared, compared to those made with potassium hydroxide.

These DMC catalysts are described, for example, in U.S. Pat. Nos. 3,278,457, 3,278,458, 3,278,459, 3,404,109, 3,427,256, 3,427,334, 3,427,335 and 5,470,813, among many others. The composition of these catalysts can vary widely, but can generally be represented by the formula

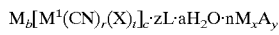

wherein M is a metal ion that forms an insoluble precipitate with the metal cyanide grouping $M^1(CN)_r(X)_t$ and which has at least one water soluble salt;

$M^1$ is a transition metal ion;

X represents a group other than cyanide that coordinates with the $M^1$ ion;

L represents an organic complexing agent;

A represents an anion that forms a water-soluble salt with M ion;

b and c are numbers that reflect an electrostatically neutral complex;

r is from 4 to 6; t is from 0 to 2; and z, n and a are positive numbers (which may be fractions) indicating the relative quantities of the complexing agent, water molecules and $M_xA_y$, respectively.

However, experience has shown that most of the possible combinations of M, $M^1$, X, L, r and t do not provide a catalyst having sufficient activity to be of commercial interest. Most combinations show virtually no activity at an. In addition, not all of those possible combinations of M, $M^1$, X, L, r and t provide very low unsaturation poly(propylene oxide) polymers. Recently, developmental and commercial efforts have focused almost exclusively on zinc hexacyanocobaltate, together with a specific complexing agent, t-butanol.

Zinc hexacyanocobaltate (together with the proper complexing agent and a quantity of a poly(propylene oxide)) has the advantages of being active and of not significantly catalyzing the propylene oxide isomerization reaction. Because of the activity of this catalyst, it can be used in such small amounts that it is less expensive to replace the catalyst than to recover it from the product polyether. As a result, finishing operations can be avoided, thereby reducing the overall production cost. However, as the catalyst is often left in the product, it must be replaced, Thus, it would be desirable to reduce the cost of the catalyst as much as possible consistent with obtaining efficient polymerizations and desirable products.

As described in U.S. Pat. No. 5,470,813, one disadvantage of DMC catalysts is that they tend to require an induction period of close to an hour to many hours in some cases before becoming active. Little polymerization occurs during this induction period, but it is followed by a strongly exothermic reaction. For some operations, particularly continuous polymerization processes, it would be desirable to reduce this induction period and to provide a less strongly exothermic reaction.

It would be desirable, therefore, to provide an active catalyst for polymerizing alkylene oxides, which is less expensive to prepare than zinc hexacyanocobaltate complexes. It would be even more desirable to provide a catalyst that exhibits a short induction period before rapidly polymerizing alkylene oxides, and especially desirable if the catalyst provides for a more controlled exotherm when rapid polymerization commences.

SUMMARY OF THE INVENTION

In one aspect, this invention is a metal [hexacyanocobaltate cobalthexanitrite nitroferricyanide] catalyst complexed with one or more organic complexing agents, wherein (a) the metal is any that forms a water-insoluble precipitate with hexacyanocobaltate, cobalthexanitrite and nitroferricyanide groups, (b) the molar ratio of hexacyanocobaltate to cobalthexanitrite groups is about 1:0.1–1.0, (c) the molar ratio of hexacyanocobaltate to nitroferricyanide groups is from about 1:0.1–1, and (d) the molar ratio of hexacyanocobaltate groups to cobalthexanitrite and nitroferricyanide groups combined is about 1:0.5–1.5.

In another aspect, this invention is an improvement in a process for polymerizing an epoxide compound in the presence of a catalyst. In the improved process, the catalyst is a metal hexacyanocobaltate cobalthexanitrite nitroferricyanide complexed with one or more organic complexing agents, said metal being any that forms a water-insoluble precipitate with hexacyanocobaltate, cobalthexanitrite and nitroferricyanide groups.

In a third aspect, this invention is a method of making an active polymerization catalyst, comprising (a) forming a first solution of water soluble hexacyanocobaltate, cobalthexanitrite and nitroferricyanide compounds, said hexacyanocobaltate, cobalthexanitrite and nitroferricyanide compounds being present in proportions such that said solution contains a molar ratio of hexacyanocobaltate to cobalthexanitrite ions of about 1:0.1–1, a molar ratio of hexacyanocobaltate to nitroferricyanitie ions of about 1:0.1–1, and a molar ratio of hexacyanocobaltate groups to cobalthexanitrite and nitroferricyanide groups combined of about 1:0.5–1.5, (b) mixing said first solution with a second solution of a water soluble salt of a metal that forms a water-insoluble precipitate with hexacyanocobaltate, cobalthexanitrite and nitroferricyanide groups so as to precipitate a metal hexacyanocobaltate cobalthexanitrite nitroferricyanide, and (c) either simultaneously with or after step (b), contacting said metal hexacyanocobaltate cobalthexanitrite nitroferricyanide with an organic complexing agent and, if no stoichiometric excess of metal salt is used in step (b), an additional quantity of a metal salt.

It has been found that the metal hexacyanocobaltate cobalthexanitrite nitroferricyanide complex of the invention has excellent activity as an epoxide polymerization catalyst. Because some of the expensive hexacyanocobaltate starting materials of conventional DMC catalysts are replaced with cobalthexanitrite and nitroferricyanide compounds, the overall cost of the catalyst is reduced significantly.

In addition, it has been found that poly(propylene oxide) polymers produced using the catalysts of this invention typically have very low unsaturation contents, even when complexing agents such as glyme are used. Using materials such as glyme instead of t-butanol as a complexing agent for the catalyst provides significant advantages in preparing and handling the catalyst complex. t-Butanol tends to cause gelling and to make it difficult to isolate the catalyst. Thus, this invention provides a method by which low unsaturation polymers of propylene oxide can be prepared with a less expensive, more easily handled catalyst.

DETAILED DESCRIPTION OF THE INVENTION

The catalyst of this invention is a metal hexacyanocobaltate cobalt hexanitrite nitroferricyanide that ion complexed with an organic complexing agent. As used herein, "hexacyanocobaltate" refers to a group having the structure $[Co(CN)_6]^{3-}$, where the cobalt is in the plus-three oxidation state, $Co^{+3}$. "Cobalthexanitrite" refers to a group having the structure $[Co(NO_2)_6]^{3-}$, where the cobalt is again in the plus-three oxidation state. Nitroferricyanide refers to the group $[Fe(CN)_5NO]^{2-}$, where the iron is in the plus-three oxidation state, $Fe^{+3}$. "Nitroferricyanide" ion is sometimes referred to as a nitroprussidate ion.

The laexacyanocobaltate, cobalthexanitrite and nitroferricyanide groups are present in certain molar ratios. The molar ratio of hexacyanocobaltate to cobalthexanitrite ions is about 1:0.1–1, and preferably about 1:0.1–0.8, more preferably about 1:0.15–0.6. The molar ratio of hexacyanocobaltate to nitroferricyanide ions is about 1:0.1–1, preferably about 1:0.2–0.9, more preferably about 1:0.3–0.8. The ratio of moles of hexacyanocobaltate groups to the combined moles cobalthexanitrite and nitroferricyanide groups is about 1:0.5–1.5, preferably about 1:0.7–1.25, more preferably about 1:0.8–1.1.

M is preferably a metal ion selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$. M is more preferably $Zn^{+2}$, $Fe^{+2}$, $Co^{+2}$, $Ni^{+2}$, $La^{+3}$ and $Cr^{+2}$. $Zn^{+2}$ is especially preferred.

Preferably, a stoichiometric excess of the metal is present, relative to the combined number of equivalent of hexacyanocobaltate, cobalthexanitrite and nitroferricyanide groups. This excess metal is believed to exist as a salt in the form $M_xA_y$, where A is an anion and x and y are numbers that reflect an electrostatically neutral salt.

The catalyst is complexed with an organiccomplexing agent. A great number of complexing agents are potentially useful, although catalyst activity may vary according to the selection of a particular complexing agent. Examples of such complexing agents include alcohols, aldehydes, ketones, ethers, amides, nitriles, sulfides, and the like.

Suitable alcohols include monoalcohols and polyalcohols. Suitable monoalcohols include methanol, ethanol, n-propanol, isopropanol, n-butanol, isobutanol, tubutanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol, 1-t-butoxy-2-propanol and the like. Suitable monoalcohols also include halogenated alcohol such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol as well as nitroalcohols, keto-alcohols, ester-alcohols, cyanoalcohols, and other inertly substituted alcohols.

Suitable polyalcohols include ethylene glycol, propylene glycol, glycerine, 1,1,1-trimethylol propane, 1,1,1-trimethylol ethane, 1,2,3-trihydroxybutane, penta-erythritol, xylitol, arabitol, mannitol, 2,5-dimethyl-3-hexyn-2,5-diol, 2,4,7,9-tetra-methyl-5-decyne-4,7-diol, sucrose, sorbitol, alkyl glucosides such as methyl glucoside and ethyl glucoside, and the like. Low molecular weight polyether polyols, particular those having an equivalent weight of about 350 or less, more preferably about 125–250, are also useful complexing agents.

Suitable aldehydes include formaldehyde, acetaldehyde, butyraldehyde, valeric aldehyde, glyoxal, benzaldehyde, toluic aldehyde and the like. Suitable ketones include acetone, methyl ethyl ketone, 3-pentanone, 2-hexanone and the like.

Suitable ethers include cyclic ethers such as dioxane, trioxymethylene and paraformaldehyde as well as acyclic ethers such as diethyl ether, 1-ethoxy pentane, bis-(betachloro ethyl) ether, methyl propyl ether, diethoxy methane, dialkyl ethers of alkylene or polyalklene glycols (such as ethylene glycol dimethyl ether, diethylene glycol dimethyl ether, triethylene glycol dimethyl ether and octaethylene glycol dimethyl ether), and the like.

Amides such as formamide, acetamide, propionamide, butyramide and valeramide are useful complexing agents. Esters such as amyl formate, ethyl formate, hexyl formate, propyl formate, ethyl acetate, methyl acetate, triethylene glycol diacetate and the like can be used as well. Suitable nitriles include acetonitrile, proprionitrile and the like. Suitable sulfides include dimethyl sulfide diethyl sulfide, dibutyl sulfide, diamyl sulfide and the like.

Compounds having an S=O group, such as dimethyl sulfoxide and sulfolane, are also useful complexing agents.

Preferred complexing agents are t-butanol, 1-t-butoxy-2-propanol, dimethyl sulfoxide (DMSO), polyether polyols having an equivalent weight of about 75–350 and dialkyl ethers of alkylene or polyalkylene glycols. Especially preferred complexing agents are t-butanol, 1-t-butoxy-2-propanol, DMSO, polyether polyols having an equivalent weight of 125–250, and a dimethyl ether of mono-, di- or triethylene glycol. t-Butanol, DMSO and glyme (1,2-dimethoxy ethane) are especially preferred.

In addition, the catalyst complex contains a quantity of water that is bound into the crystalline lattice of the complex.

In addition to the water and organic complexing agent, it has been found that handling and filtering the catalyst complex is easier if is treated with a polyether polyol of a molecular weight of about 300–4000.

The catalyst complex is conveniently made by dissolving water-soluble hexacyanocobaltate, cobalthexanitrite and nitroferricyanide compounds in water and combining the resulting solution(s) with an aqueous solution of a water soluble metal salt. The hexacyanocobaltate, cobalthexanitrite and nitroferricyanide solutions can be made individually, or as a single solution. If made separately, the hexacyano-cobaltate, cobalthexanitrite and nitroferricyanide solutions are either blended before being added to the solution of the metal salt, or else are added simultaneously to the solution of the metal salt. Upon mixing the solutions, a metal [hexacyanocobaltate, cobalthexanitrite and nitroferricyanide] complex precipitates. The precipitate is treated with an organic complexing agent of the type described above, and optionally is treated with a polyether polyol as well.

Any water-soluble hexacyanocobaltate, cobalthexarntrite and nitroferricyanide compounds can be used. Preferably, the compounds are those represented by the structures $B_3[Co(CN)_6]$, $B_3[Co(NO_2)_6]$ and $B_2[Fe(CN)_5NO]$, where B is hydrogen or an alkali metal. For the hexacyanocobaltate compounds, B is preferably sodium or potassium. For the cobalthexanitrite compounds and nitroferricyanide compounds, B is preferably hydrogen, sodium or potassium and most preferably hydrogen. Compounds in which B is hydrogen are conveniently formed by passing an aqueous solution of the corresponding alkali metal salt through a cation-exchange resin that is in the hydrogen form.

The metal salt is any water-soluble compound that will react with the hexacyanocobaltate, cobalthexanitrite and nitroferricyanide compounds to form a metal [hexacyanocobaltate, cobalthexanitrite nitroferricyanide] precipitate. The metal salt suitably is one represented by the structure $M_xA_y$, where M, A, x and y are as defined before. Suitable anions A include halides such as chloride and bromide, nitrate, sulfate, carbonate, cyanide, oxalate, thiocyanate, isocyanate, isothiocyanate, and $C_{1-4}$ carboxylate. Chloride ion is especially preferred.

Especially suitable metal salts include zinc halides, zinc hydroxide, zinc sulfate, zinc carbonate, zinc cyanide, zinc oxalate, zinc thiocyanate, zinc isocyanate, zinc $C_{1-4}$ carboxylates, and zinc nitrate. Zinc chloride, zinc acetate and zinc nitrate are most preferred.

The catalyst complex is precipitated by mixing the solution of the metal salt with the solution(s) of the hexacyanocobaltate, cobalthexanitrite and nitroferricyanide compounds. The temperature of mixing is not critical, provided that the starting materials remain in solution until the mixing is performed. Temperatures of about 10° C. up to the boiling temperature of the solution, particularly 15–35° C., are most suitable. The mixing can be done with rapid agitation. Intimate mixing techniques as are described in U.S. Pat. No. 5,470,813 can be used, but are not necessary.

In this initial mixing, at least a stoichiometric amount of the metal salt is used. In one variation, a stoichiometric excess of metal salt is used in the initial mixing. In another variation described more below, only a stoichiometric amount of metal salt is used in the initial mixing, with additional metal salt being added in a later step. By "stoichiometric amount", it is meant an amount sufficient to form an electrostatically neutral precipitate with the hexacyanocobaltate, cobalt hexanitrite and nitroferricyanide ions, with substantially no excess of the metal salt being used.

The complexing agent, either neat or as an aqueous solution, typically is added before significant precipitation of the metal [hexacyanocobaltate, cobalthexanitrite nitroferricyanide] occurs, generally by adding, the complexing agent immediately after mixing the solutions of metal salt and hexacyanocobaltate, cobalthexanitrite and nitroferricyanide. If desired, the complexing agent can be mixed into the metal salt solution or the hexacyanocobaltate, cobalthexanitrite and nitroferricyanide solution, or both. After adding this initial amount of complexing agent, the mixture is generally stirred for several minutes to allow the desired catalyst complex to form and precipitate.

The resulting precipitated catalyst complex is then recovered by a suitable technique such as filtration. Preferably, the catalyst complex is subjected to one or more subsequent washings with water, complexing agent, polyether polyol (when used) or some combination thereof This is conveniently done by re-slurrying the catalyst in the liquid with agitation for several minutes and filtering. Washing is preferably continued at least until essentially all unwanted ions, particularly alkali metal and halide ions, are removed from the complex.

When a polyether polyol is used in the catalyst complex, it can be added with the initial amount of complexing agent, or in one or more subsequent washings of the complex.

The final catalyst complex is conveniently dried, preferably under vacuum and moderately elevated temperatures (such as from about 50–60° C.) to remove excess water and volatile organics. Drying is preferably done until the catalyst complex reaches a constant weight.

In an alternative technique for forming the catalyst complex, an aqueous solution containing only a stoichiometric amount of metal salt in relation to the combined amount of hexacyanocobaltate, cobalthexanitrite and nitroferricyanide compounds is used in the initial mixing and precipitation step. After the initial precipitation is complete, the precipitate is washed with water to remove unwanted ions. The precipitate is then combined with a small amount of a solution containing water, additional metal salt, and complexing agent. The metal salt used may the same as that used in forming the precipitate, or may be a salt of a different metal. The amount of this added solution is preferably that amount which is absorbed by the precipitate. A typical amount of solution to be used is from about 0.5, preferably from about 0.8, more preferably from about 1, to about 2, preferably to about 1.5 milliliters, of solution per gram of isolated precipitate. The amount of metal salt added with this solution is advantageously from about 9, preferably from about 11 to about 30, preferably to about 25, parts by weight per 100 parts by weight of the isolated precipitate. The complexing agent is advantageously present in a weight ratio of about 90:10 to about 10:90, preferably about 70:30 to about 30:70, with the water. If desired, a polyether polyol can be included in the solution. The resulting catalyst complex can be dried and used without further treatment, or may be subjected to additional washings with water as before, although it is preferred not to perform additional washings with completing agent or polyether polyol.

In addition, the catalyst may be formed directly as a dispersion in an initiator compound, as described in copending application no. 09/574,847, filed May 19, 2000, entitled Method for Preparing Metal Cyanide Catalyst/Polyol Initiator Slurries.

Furthermore, it is also possible to form a filterable and/or supported catalyst by precipitating the catalyst in the presence of a polycarboxyl or polycarboxylate compound, as described in copending application no. 09/574,848, filed May 19, 2000, entitled Method for Preparing Metal Cyanide Catalysts using Polycarboxylic Acids, or in the presence of a silane-functional complexing agent, as described in the copending application no. 09/574,842, filed May 19, 2000, entitled Method for Preparing Metal Cyanide Catalysts using Silane-functional Ligands.

The catalyst complex of the invention is used to polymerize alkylene oxides to make polyethers. In general, the process includes mixing a catalytically effective amount of the catalyst with an alkylene oxide under polymerization conditions, and allowing the polymerization to proceed until the supply of alkylene oxide is essentially exhausted. The concentration of the catalyst is selected to polymerize the alkylene oxide at a desired rate or within a desired period of time. Generally, a suitable amount of catalyst is from about 5 to about 10,000 parts by weight metal cyanide catalyst per million parts combined weight of alkylene oxide, and initiator and comonomers, if present. More preferred catalyst levels are from about 10, especially from about 25, to about 500, more preferably about 100 ppm, most preferably about 50 ppm, on the same basis.

For making high molecular weight monofunctional polyethers, it is not necessary to include an initiator compound. However, to control molecular weight, impart a desired functionality (number of hydroxyl groups/molecule) or a desired functional group, an initiator compound is preferably mixed with the catalyst complex at the beginning of the reaction. Suitable initiator compounds include imonoalcolaols such methanol, ethanol, n-propanol, isopropanol, n-butanol, isobutanol, t-butanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 2-butene-1-ol and the like. Suitable monoalcohol initiator compounds include halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol and 1-t-butoxy-2-propanol as well as nitroalcohols, keto-alcohols, ester-alcohols, cyanoalcohols, and other inertly substituted alcohols. Suitable polyalcohol initiators include ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol sucrose, sorbitol, alkyl glucosides such as methyl glucoside and ethyl glucoside and the like. However, the catalyst tends to perform better when the initiator is a polyether polyol, particularly one having an equivalent weight of about 350 or less, more preferably about 125–250.

Among the alkylene oxides that can be polymerized with the catalyst complex of the invention are ethylene oxide, propylene oxide, 1,2-butylene oxide, styrene oxide, and mixtures thereof. Various alkylene oxides can be polymerized sequentially to make block copolymers. More preferably, the alkylene oxide is propylene oxide or a mixture of propylene oxide and ethylene oxide and/or butylene oxide. Especially preferred are propylene oxide alone or a mixture of at least 75 weight % propylene oxide and up to about 25 weight % ethylene oxide.

In addition, monomers that will copolymerize with the alkylene oxide in the presence of the catalyst complex can be used to prepare modified polyether polyols. Such comonomers include oxetanes as described in U.S. Pat. Nos. 3,278,457 and 3,404,109 and anhydrides as described in U.S. Pat. Nos. 5,145,883 and 3,538,043, which yield polyethers and polyester or polyetherester polyols, respectively. Hydroxyalkanoates such as lactic acid, 3-hydroxybutyrate, 3-hydroxyvalerate (and their dimers), lactones and carbon dioxide are examples of other suitable monomers that can be polymerized with the catalyst of the invention.

The polymerization reaction typically proceeds well at temperatures from about 25 to about 150° C., preferably from about 80–130° C. A convenient polymerization technique involves mixing the catalyst complex and initiator, and pressuring the reactor with the alkylene oxide. After a short induction period, polymerization proceeds, as indicated by a loss of pressure in the reactor. Once the polymerization has begun, additional alkylene oxide is conveniently fed to the reactor on demand, until enough alkylene oxide has been added to produce a polymer of the desired equivalent weight.

Another convenient polymerization technique is a continuous method. In such continuous processes, an activated initiator/catalyst mixture is continuously fed into a continuous reactor such as a continuously stirred tank reactor (CSTR) or a tubular reactor. A feed of alkylene oxide is introduced into the reactor and the product continuously removed.

The catalyst of this invention is especially useful in making propylene oxide homopolymers and random copolymers of propylene oxide and up to about 15 weight percent ethylene oxide (based on all monomers). The polymers of particular interest have a hydroxyl equivalent weight of from about 800, preferably from about 1000, to about 5000, preferably about 4000, more preferably to about 2500, and unsaturation of no more than 0.02 meq/g, preferably no more than about 0.01 meq/g.

The product polymer may have various uses, depending on its molecular weight, equivalent weight, functionality and the presence of any functional groups. Polyether polyols so made are useful as raw materials for making polyurethanes. Polyethers can also be used as surfactants, hydraulic fluids, as raw materials for making surfactants and as starting materials for making aminated polyethers, among other uses.

The following examples are provided to illustrate the invention, but are not intended to limit its scope. All parts and percentages are by weight unless otherwise indicated.

EXAMPLE 1

A. Catalyst Preparation

Into 7 ml of distilled water are dissolved 4 grams of potassium hexacyano-cobaltate. Sodium nitroferricyanide ($Na_2[Fe(CN)_5NO]$) (3 grams) is dissolved into 50 ml of distilled water, and the resulting solution is passed though a macroporous styrene-divinylbenzene copolymer cation exchange resin that has been treated with HCl to convert it to the hydrogen form. The eluted $H_2[Fe(CN)_5NO]$ solution is collected. Sodium hexanitrocobaltate (1 g) is dissolved in 15 ml of distilled water and passed through an ion exchange resin as before to produce an eluted $H_3[Co(NO_2)_6]$ solution, which is collected.

The three solutions are added together at room temperature and mixed with a solution of 25 g $ZnCl_2$ in 40 ml of distilled water. A solution of 100 ml t-butanol and 100 ml of distilled water is immediately added, and the slurry is stirred for 10 minutes at room temperature. Then, 2 g of a 4000 molecular weight polyoxypropylene diol is added, followed by stirring an additional three minutes at room temperature. The resulting slurry is filtered through a Buchner funnel and Whatman No. 40 filter paper. The solids are re-slurried at room temperature in a solution of 140 ml t-butanol, 60 ml of water and 2 g of the same polyoxypropylene diol, and stirred for 10 minutes at room temperature. The solids are again filtered, and re-slurried a second time in a mixture of 200 ml t-butanol and 1 gram of the same polyoxypropylene diol. The solids are filtered and dried for 18 hours at 50° C. under vacuum. The resulting product is designated Catalyst Complex 1.

Catalyst Complex 2 is made in the same manner, except that in all instances, an equivalent volume of glyme (1,2-dimethoxy ethane) replaces the t-butanol.

Catalyst Complex 3 is made in the same manner as Catalyst Complex 1, except the amount of sodium hexanitrocobaltate is 2 grams and the amount of sodium nitroferricyanide is 2 grams.

Catalyst Complex 4 is made in the same manner as Catalyst Complex 3, except that in all instances, an equivalent volume of glyme replaces the t-butanol.

Catalyst Complex 5 is made in the same manner as Catalyst Complex 1, except the amount of sodium hexanitrocobaltate is 3 g and the amount of sodium nitroferricyanide is 1 gram.

Catalyst Complex 6 is made in the same manner as Catalyst Complex 5, except that in all instances, an equivalent volume of glyme replaces the t-butanol.

B. Propylene Oxide Polymerizations

1. Room temperature polymerizations

The activity of each of Catalyst Complexes 1–6 is evaluated by mixing 0.1 g of the Catalyst Complex and 3 g of propylene oxide in a capped glass vial, and allowing the mixture to stir at room temperature until polymerization of the propylene oxide occurs as evidenced by a vigorous exotherm and rapid conversion to a thick, viscous polymer. The time required for the polymerization to occur is reported in Table 1 below, as an indication of the activity of the Catalyst Complexes.

2. Initiated elevated temperature polymerizations 30 grams of a 700 MW polyether triol and 0.2 grams of Catalyst Complex are mixed in a Parr reactor. After purging with nitrogen, the mixture is heated to 100° C. and pressurized to 50 psig with propylene oxide. After an induction period, propylene oxide polymerization begins, as indicated by a drop in pressure inside the Parr reactor. An exotherm is seen in each case when polymerization begins. When the propylene oxide is consumed, the Parr reactor is repressurized to 50 psig with additional propylene oxide, until a total of 140 g of propylene oxide has been added and polymerized. The unsaturation level of the resulting polyether polyol is measured. The length of the induction period and unsaturation level of the product are reported in Table 1, together with qualitative information about the exotherm.

As shown by the data in Table 1, the catalysts of this invention are active, have short induction periods and produce polypropylene oxide polyols with low levels of unsaturation. Of particular note are Catalyst Complexes 2, 4 and 6, which all form polyols having very low unsaturation even though glyme is used as the complexing agent. Previously, the production of very low unsaturation polyethers has not been considered possible using glyme as the complexing agent.

What is claimed is:

1. A metal hexacyanocobaltate cobalthexanitrite nitroferricyanide catalyst complexed with one or more organic complexing agents, wherein (a) the metal is any that forms a water-insoluble precipitate with hexacyanocobaltate cobalthexanitrite and nitroferricyanide groups, (b) the molar ratio of hexacyanocobaltate to cobalthexanitrite groups is about 1:0.1–1.0, (c) the molar ratio of hexacyanocobaltate to nitroferricyanide groups is from about 1:0.1–1.0, (d) the molar ratio of hexacyanocobaltate groups to cobalthexanitrite and nitroferricyanide groups combined is about 1:0.5–1.5 and (e) the complexing agent is selected from the group consisting of include alcohols, aldehydes, ketones, ethers, amides, nitriles, sulfides and compounds having an S=O group.

2. The catalyst of claim 1 wherein said metal is zinc.

3. The catalyst of claim 2 wherein the molar ratio of hexacyanocobaltate to cobalthexanitrite ions is about 1:0.15–0.6, the molar ratio of hexacyanocobaltate to nitroferricyanide ions about 1:0.3–0.8 and molar ratio of hexacyanocobaltate to the combined moles cobalthexanitrite and nitroferricyanide groups is about 1:0.8–1.1.

4. The catalyst of claim 3 wherein the complexing agent is t-butanol, 1-t-butoxy-2-propanol, dimethyl sulfoxide, a polyether polyol having an equivalent weight of about 75–350, or a dialkyl ether of an alkylene or polyalkylene glycol.

5. In a process for polymerizing an epoxide compound in the presence of a catalyst, the improvement wherein the catalyst is a metal hexacyanocobaltate cobalthexanitrite nitroferricyanide complexed with one or more organic complexing agents, said metal being any that forms a water-insoluble precipitate with hexacyanocobaltate cobalthexanitrite and nitroferricyanide groups, said complexing agent being selected from the group consisting of alcohols, aldehydes, ketones, ethers, amides, nitriles, sulfides and compounds having an S=O group, and wherein (a) the molar ratio of hexacyanocobaltate to cobalthexanitrite groups is about 1:0.1–1.0, (b) the molar ratio of hexacyanocobaltate to nitroferricyanide groups is from about 1:0.1–1.0 and (c) the molar ratio of hexacyanocobaltate groups to cobalthexanitrite and nitroferricyanide groups combined is about 1:0.5–1.5.

TABLE 1

| Catalyst Complex | Complexing agent | R. T. Polym. Time | Elevated Temperature Polymerization | |
|---|---|---|---|---|
| | | | Induction time/Exotherm | Unsaturation (meq/g) |
| 1 | t-butanol | 1 hour | 5 min/controlled | Not determined |
| 2 | Glyme | 1.5 hours | 12 min/controlled | 0.001 |
| 3 | t-butanol | 3 hours | 8 min/severe | 0.011 |
| 4 | Glyme | 2 hours | 12 min/controlled | 0.001 |
| 5 | t-butanol | 1 hour | 6 min/severe | 0.011 |
| 6 | Glyme | 1 hour | 6 min/severe | 0.011 |

6. The improved process of claim 5, wherein the epoxide compound is propylene oxide or a mixture of propylene oxide and up to about 15 weight percent of ethylene oxide.

7. The improved process of claim 6, wherein the product of the process is a polyether having a hydroxyl equivalent weight of from about 800 to about 5000.

8. The improved process of claim 7, wherein the polyether contains no more than 0.02 meq/g of unsaturation.

9. The improved process of claim 8, wherein the polyether contains no more than 0.01 meq/g of unsaturation.

10. The improved process of claim 8 wherein said metal is zinc.

11. The improved process of claim 10 wherein the molar ratio of hexacyanocobaltate to cobalthexanitrite ions is about 1:0.15–0.6, the molar ratio of hexacyanocobaltate to nitroferricyanide ions about 1:0.3–0.8 and molar ratio of hexacyanocobaltate to the combined moles cobalthexanitrite and nitroferricyanide groups is about 1:0.8–1.1.

12. The improved process claim 11 wherein the complexing agent is t-butanol, 1-t-butoxy-2-propanol, dimethyl sulfoxide, a polyether polyol having an equivalent weight of about 75–350, or a dialkyl ether of an alkylene or polyalkylene glycol.

13. A method of making an active polymerization catalyst, comprising
   (a) forming a first solution of water soluble hexacyanocobaltate, cobalthexanitrite and nitroferricyanide compounds, said hexacyanocobaltate, cobalthexanitrite and nitroferricyanide compounds being present in proportions such that said solution contains a molar ratio of hexacyanocobaltate to cobalthexanitrite ions of about 1:0.1–1, a molar ratio of hexacyanocobaltate to nitroferricyanide ions of about 1:0.1–1.0, and a molar ratio of hexacyanocobaltate groups to cobalthexanitrite and nitroferricyanide groups combined of about 1:0.5–1.5,
   (b) mixing said first solution with a second solution of a water soluble salt of a metal that forms a water-insoluble insoluble precipitate with hexacyanocobaltate cobalthexanitrite and nitroferricyanide groups so as to precipitate a metal hexacyanocobaltate cobalthexanitrite nitroferricyanide, and
   (c) either simultaneously or after step (b), contacting said metal hexacyanocobaltate cobalthexanitrite nitroferricyanide with an organic complexing agent selected from the group consisting of alcohols, aldehydes, ketones, ethers, amides, nitriles, sulfides and compounds having an S=O group and, if no stoichiometric excess of metal salt is used in step (b), an additional quantity of a metal salt.

14. The process of claim 13 wherein said water soluble hexacyanocobaltate cobalthexanitrite and nitroferricyanide compounds are represented by the structures $B_3[Co(CN)_6]$, $B_3[Co(NO_2)_6]$ and $B_2[Fe(CN)_5NO]$, respectively, where B is hydrogen or an alkali metal.

15. The process of claim 14, wherein said metal is zinc.

16. The process of claim 15, wherein the molar ratio of hexacyanocobaltate to cobalthexanitrite ions is about 1:0.15–0.6, the molar ratio of hexacyanocobaltate to nitroferricyanide ions about 1:0.3–0.8 and molar ratio of hexacyanocobaltate to the combined moles of cobalthexanitrite and nitroferricyanide ion is about 1:0.8–1.1.

17. The process of claim 16 wherein the complexing agent is t-butanol, 1-t-butoxy-2-propanol, dimethyl sulfoxide, a polyether polyol having an equivalent weight of about 75–350, or a dialkyl ether of an alkylene or polyalkylene glycol.

* * * * *